US010268336B2

(12) United States Patent
Liang et al.

(10) Patent No.: US 10,268,336 B2
(45) Date of Patent: Apr. 23, 2019

(54) USER INTERFACE DISPLAYING AND PROCESSING METHOD AND USER INTERFACE DISPLAYING AND PROCESSING DEVICE

(71) Applicant: SHENZHEN SKYWORTH-RGB ELECTRONIC CO., LTD., Shenzhen, Guangdong (CN)

(72) Inventors: Quanqing Liang, Guangdong (CN); Weilong Lv, Guangdong (CN); Qiumei Ning, Guangdong (CN)

(73) Assignee: SHENZHEN SKYWORTH-RGB ELECTRONICS CO., LTD., Shenzhen (CN)

( * ) Notice: Subject to any disclaimer, the term of this patent is extended or adjusted under 35 U.S.C. 154(b) by 188 days.

(21) Appl. No.: 15/317,127

(22) PCT Filed: Mar. 8, 2016

(86) PCT No.: PCT/CN2016/075878
§ 371 (c)(1),
(2) Date: Dec. 8, 2016

(87) PCT Pub. No.: WO2017/088318
PCT Pub. Date: Jun. 1, 2017

(65) Prior Publication Data

US 2017/0285883 A1 Oct. 5, 2017

(30) Foreign Application Priority Data

Nov. 23, 2015 (CN) .......................... 2015 1 0823978

(51) Int. Cl.
*G06F 3/14* (2006.01)
*G06F 3/0481* (2013.01)
(Continued)

(52) U.S. Cl.
CPC ............ *G06F 3/0481* (2013.01); *G06F 9/451* (2018.02); *G06T 1/20* (2013.01); *H04L 67/34* (2013.01);
(Continued)

(58) Field of Classification Search
CPC ..................................... G06F 3/14; G06F 3/17
(Continued)

(56) References Cited

U.S. PATENT DOCUMENTS

2012/0081353 A1* 4/2012 Yusupov ............. H04L 67/1095 345/418
2012/0092335 A1* 4/2012 Kim .................... H04N 21/414 345/419
(Continued)

FOREIGN PATENT DOCUMENTS

CN 104035768 A 9/2014

OTHER PUBLICATIONS

International Search Report of PCT Patent Application No. PCT/CN2016/075878 dated Aug. 18, 2016.

*Primary Examiner* — Ruay Ho

(57) ABSTRACT

The present disclosure provides a user interface displaying and processing method comprising following steps: applying Surface from a SurfaceFlinger to serve as a drawing board for drawing an interface; binding an OpenGL ES after being initialized and the Surface which is applied to server as the drawing board; controlling a function of the OpenGL ES to draw the interface on the Surface which is applied to server as the drawing board; after the interface has already been drawn, combining all Surfaces to form drawing board window data and exchanging the drawing board window data with display frame buffer window data; outputting to display the exchanged display frame buffer window data. The present disclosure further provides a user interface
(Continued)

displaying and processing device. The present disclosure can improve the portability of applications.

14 Claims, 5 Drawing Sheets

(51) Int. Cl.
*G06F 9/451* (2018.01)
*G06T 1/20* (2006.01)
*H04L 29/08* (2006.01)
*H04L 29/06* (2006.01)

(52) U.S. Cl.
CPC .............. *H04L 67/38* (2013.01); *H04L 67/42* (2013.01); *G06T 2200/24* (2013.01)

(58) Field of Classification Search
USPC .......... 715/733; 345/2.3, 173, 418, 419, 522
See application file for complete search history.

(56) References Cited

U.S. PATENT DOCUMENTS

2014/0028574 A1* 1/2014 McCaffrey .............. G06F 9/451 345/173
2015/0193904 A1* 7/2015 Vermeulen ................ G06T 1/20 345/522
2016/0188279 A1* 6/2016 Rajamani .............. G06F 3/1454 345/2.3

* cited by examiner

USER INTERFACE DISPLAYING AND PROCESSING METHOD AND USER INTERFACE DISPLAYING AND PROCESSING DEVICE

TECHNICAL FIELD

The subject matter relates to television technology, and particularly, to a user interface displaying and processing method and a user interface displaying and processing device.

DESCRIPTION OF RELATED ART

It is well-known that Android system comprises Linux kernel, Library, Dalvik virtual machine, and Android application framework. In an intelligent television system, Android applications usually draw graphical interfaces based on the Dalvik virtual machine and the Android application framework, thus making the applications to have a high dependency and a low portability.

BRIEF SUMMARY OF THE DISCLOSURE

A main object of the present disclosure is to provide a user interface displaying and processing method and a user interface displaying and processing system which can improve the portability of the applications.

To achieve that, the present disclosure provides a user interface displaying and processing method comprising following steps:

applying Surface from a SurfaceFlinger to serve as a drawing board for drawing an interface;

binding an OpenGL ES after being initialized and the Surface which is applied to server as the drawing board;

controlling a function of the OpenGL ES to draw the interface on the Surface which is applied to server as the drawing board;

after the interface has already been drawn, combining all Surfaces to form drawing board window data and exchanging the drawing board window data with display frame buffer window data;

outputting to display the exchanged display frame buffer window data.

Preferably, the step of "controlling a function of the OpenGL ES to draw the interface on the Surface which is applied to server as the drawing board" further comprises following steps:

controlling the function of the OpenGL ES to draw graphics, by a graphic function of the OpenGL ES, on the Surface which is applied to server as the drawing board to form the interface; or controlling the function of the OpenGL ES to map, by texture mapping, on the Surface which is applied to server as the drawing board to form the interface.

Preferably, when the function of the OpenGL ES is controlled to draw the interface, the interface is dynamically displayed by a number of interface graphics, or the interface is dynamically displayed by render changing of OpenGL ES.

Preferably, the user interface displaying and processing method further comprises following steps:

establishing a communication mechanism with a preset shell application;

receiving and processing operation information transmitted by the shell application, the operation information being input information received by the shell application and commands from a preset window manager.

Preferably, the user interface displaying and processing method further comprises following steps:

when a user interface displaying command is detected, calling a show( ) function to display an interface corresponding to the display frame buffer window data;

when a user interface hiding command is detected, calling a hide( ) function to hide an interface corresponding to the display frame buffer window data.

In addition, to achieve that, the present disclosure further provides a user interface displaying and processing device comprising:

a drawing board applying module configured to apply Surface from a SurfaceFlinger to serve as a drawing board for drawing an interface;

a binding module configured to bind an OpenGL ES after being initialized and the Surface which is applied to server as the drawing board;

a control module configured to control a function of the OpenGL ES to draw the interface on the Surface which is applied to server as the drawing board;

a data exchanging module configured to combine all Surfaces to form drawing board window data and exchange the drawing board window data with display frame buffer window data after the interface has already been drawn;

an outputting module configured to output to display the exchanged display frame buffer window data.

Preferably, the control module is configured to:

control the function of the OpenGL ES to draw graphics, by a graphic function of the OpenGL ES, on the Surface which is applied to server as the drawing board to form the interface; or control the function of the OpenGL ES to map, by texture mapping, on the Surface which is applied to server as the drawing board to form the interface.

Preferably, the control module is further configured to dynamically display the interface by a number of interface graphics or dynamically display the interface by render changing of OpenGL ES, when the function of the OpenGL ES is controlled to draw the interface.

Preferably, the user interface displaying and processing device further comprises:

a communication module configured to establish a communication mechanism with a preset shell application;

a receiving module configured to receive and process operation information transmitted by the shell application, the operation information being input information received by the shell application and commands from a preset window manager.

Preferably, the user interface displaying and processing device further comprises:

a calling module configured to call a show( ) function to display an interface corresponding to the display frame buffer window data when a user interface displaying command is detected; and call a hide( ) function to hide an interface corresponding to the display frame buffer window data when a user interface hiding command is detected.

The present disclosure applies Surface from a SurfaceFlinger to serve as a drawing board for drawing an interface; binding an OpenGL ES after being initialized and the Surface which is applied to server as the drawing board; controlling a function of the OpenGL ES to draw the interface on the Surface which is applied to server as the drawing board; after the interface has already been drawn, combining all Surfaces to form drawing board window data and exchanging the drawing board window data with display frame buffer window data; outputting to display the exchanged display frame buffer window data. Since the drawing and displaying of the user interface of the present disclosure is independent of the Android application framework and the Dalvik virtual machine, the portability of the application is improved.

The technical solution of the present invention is hereinafter described in detail with reference to the accompanying drawings.

DETAILED DESCRIPTION

It should be appreciate that the embodiments described herein are only intended to illustrate, but not to limit the present disclosure.

The main object of the present disclosure is to draw a user interface (UI) independent of the Android application framework and the Dalvik virtual machine. Furthermore, the user interface can be drawn independently, and also can be drawn seamlessly with the Android application framework. The user can operate it just like he or she is operating a common application. The user interface can be immediately displayed when the user interface is needed to be displayed, and also can be immediately hided when the user interface is needed to be hided.

Figure 1:
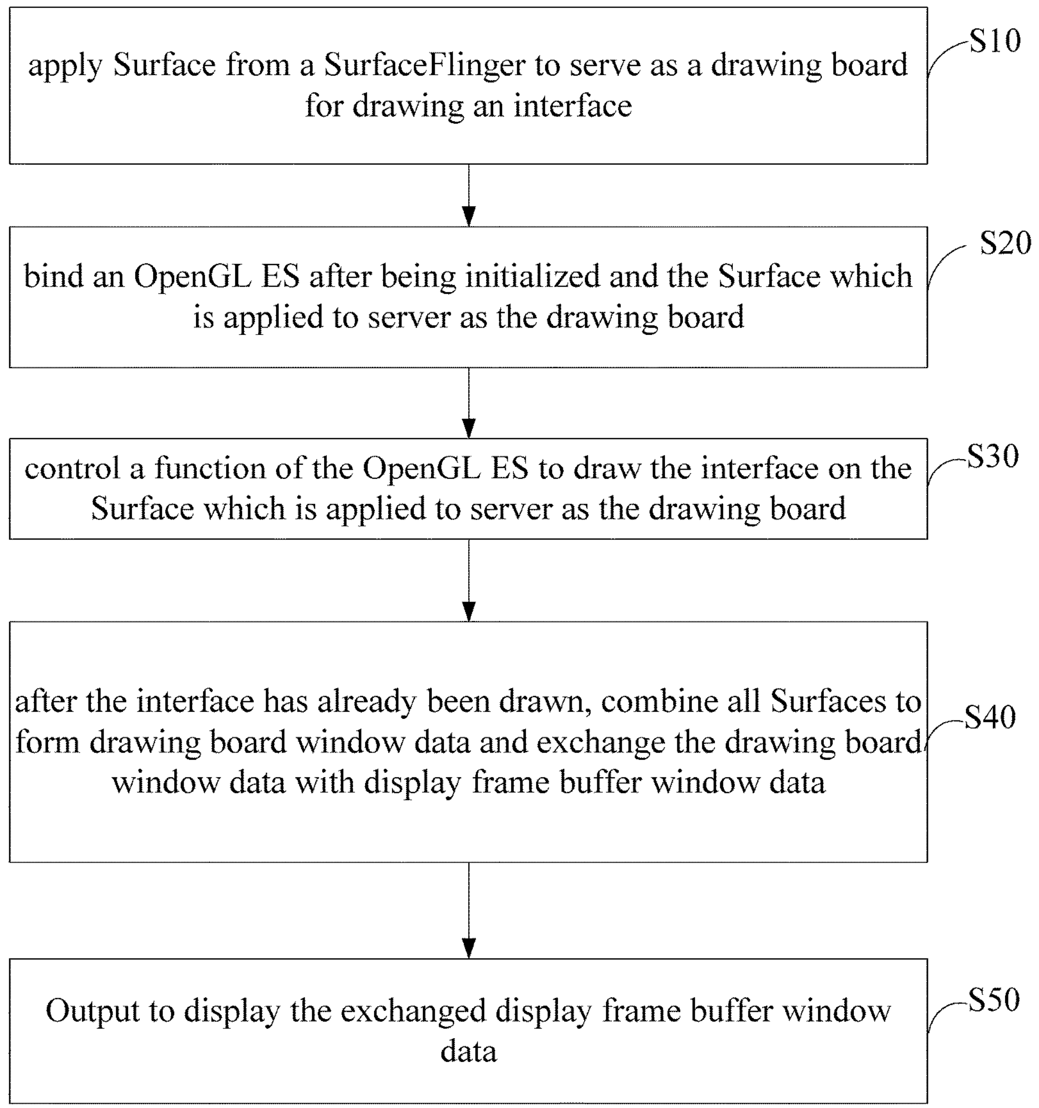
FIG. 1 is a flowchart of an embodiment of a user interface displaying and processing method.

FIG. 1 illustrates that a user interface displaying and processing method comprises following steps:

At step S10, applying Surface from a SurfaceFlinger to serve as a drawing board for drawing an interface;

Since the user interface is drawn on a screen of a terminal, thus, a drawing board on which the user interface can be drawn is needed to be applied. The drawing board can be a frame buffer of hardware or a display object managed by an operation system. Since the user interface of the present disclosure is needed to be drawn seamlessly with the Android application framework, thus, the user interface displaying and processing method of the present disclosure applies the Surface from the SurfaceFlinger to serve as the drawing board for drawing the interface.

At step S20, binding an OpenGL ES after being initialized and the Surface which is applied to server as the drawing board;

In detail, OpenGLES (OpenGL for Embedded Systems) includes subsets of the OpenGL 3D Graphics API, and is designed according to embedded devices such as mobile phones, personal digital assistant (PDA), and game servers. The API is designed and promoted by Khronos Group. The Khronos Group is a graphic software and hardware industrial association which focuses on creating open standards for graphics and multimedia. OpenGL ES is a royalty-free and cross-platform API for full-function 2D and 3D graphics on embedded systems-including consoles, mobile phones, hand-held devices, appliances, and vehicles. It consists of well-defined subsets of desktop OpenGL, creating a flexible and powerful low-level interface between software and graphics acceleration. OpenGL ES includes profiles for floating-point and fixed-point systems, and the EGL specification for portably binding to native windowing systems. OpenGL ES 1.X is designed according to fixed function hardware and offers acceleration, image quality, and performance. OpenGL ES 2.X enables full programmable 3D graphics including cover devices.

When OpenGLES and the Surface are bounded, OpenGLES can communicate with the window system of the local system, thereby allowing the mathematical graphic operations of OpenGLES to be displayed on the Surface. Before operating OpenGLES, OpenGLES is needed to be initialized. After being initialized, OpenGLES and the Surface are bounded.

At step S30, controlling a function of the OpenGL ES to draw the interface on the Surface which is applied to server as the drawing board;

In the embodiment, the interface is drawn by the function of OpenGLES. In detail, when the interface is drawn, the function of OpenGLES is directly used to draw graphics on the Surface to form the user interface. It is understandable that when the interface is drawn, the graphic function of OpenGLES or texture mapping can be used. That is, in the embodiment, the step S30 further comprises: controlling the function of the OpenGL ES to draw graphics, by a graphic function of the OpenGL ES, on the Surface which is applied to server as the drawing board to form the interface; or controlling the function of the OpenGL ES to map, by texture mapping, on the Surface which is applied to server as the drawing board to form the interface.

At step S40, after the interface has already been drawn, combining all Surfaces to form drawing board window data and exchanging the drawing board window data with display frame buffer window data;

At step S50, outputting to display the exchanged display frame buffer window data.

In the embodiment, when a user interface has already been drawn, data is exchanged between display frame buffer window and drawing board window, thereby combining all the Surface to form the drawing board window data which is transferred to frame buffer window, that is, the drawing board window data is stored in a graphic memory; finally, the data in the graphic memory is output to display, thus the user interface can be displayed. In detail, a display chip can directly process the data of the frame buffer window, convert pixel signals if necessary, and output detail pixel signals to the screen. The screen can display the corresponding pixel according to the pixel signals.

The present disclosure applies Surface from a SurfaceFlinger to serve as a drawing board for drawing an interface; binding an OpenGL ES after being initialized and the Surface which is applied to server as the drawing board; controlling a function of the OpenGL ES to draw the interface on the Surface which is applied to server as the drawing board; after the interface has already been drawn, combining all Surfaces to form drawing board window data and exchanging the drawing board window data with display frame buffer window data; outputting to display the exchanged display frame buffer window data. Since the drawing and displaying of the user interface of the present disclosure is independent of the Android application framework and the Dalvik virtual machine, the portability of the application is improved.

Furthermore, in the embodiment, when the function of the OpenGL ES is controlled to draw the interface, the interface is dynamically displayed by a number of interface graphics, or the interface is dynamically displayed by render changing of OpenGL ES.

In detail, in the embodiment, the user interface can be statically or dynamically displayed. When the user interface is dynamically displayed, a number of interface graphics are used, or the render changing of OpenGL ES is used. For example, when a number of interface graphics are used to dynamically display the user interface, the interface is periodically drawn on the Surface which is applied to serve as the drawing board at a preset time interval, all Surface are combined to form the drawing board window data, the drawing board window data is exchanged with the display frame buffer window data, and the exchanged display frame buffer window data is output to display, thereby dynamically displaying the user interface. When the rendering changing of OpenGLES is used to dynamically display the user interface, the interface drawn on the Surface is periodically rendered at a preset time interval to obtain different effects, all Surface are combined to form the drawing board window data, the drawing board window data is exchanged with the display frame buffer window data, and the exchanged display frame buffer window data is output to display, thereby dynamically displaying the user interface.

Figure 2:
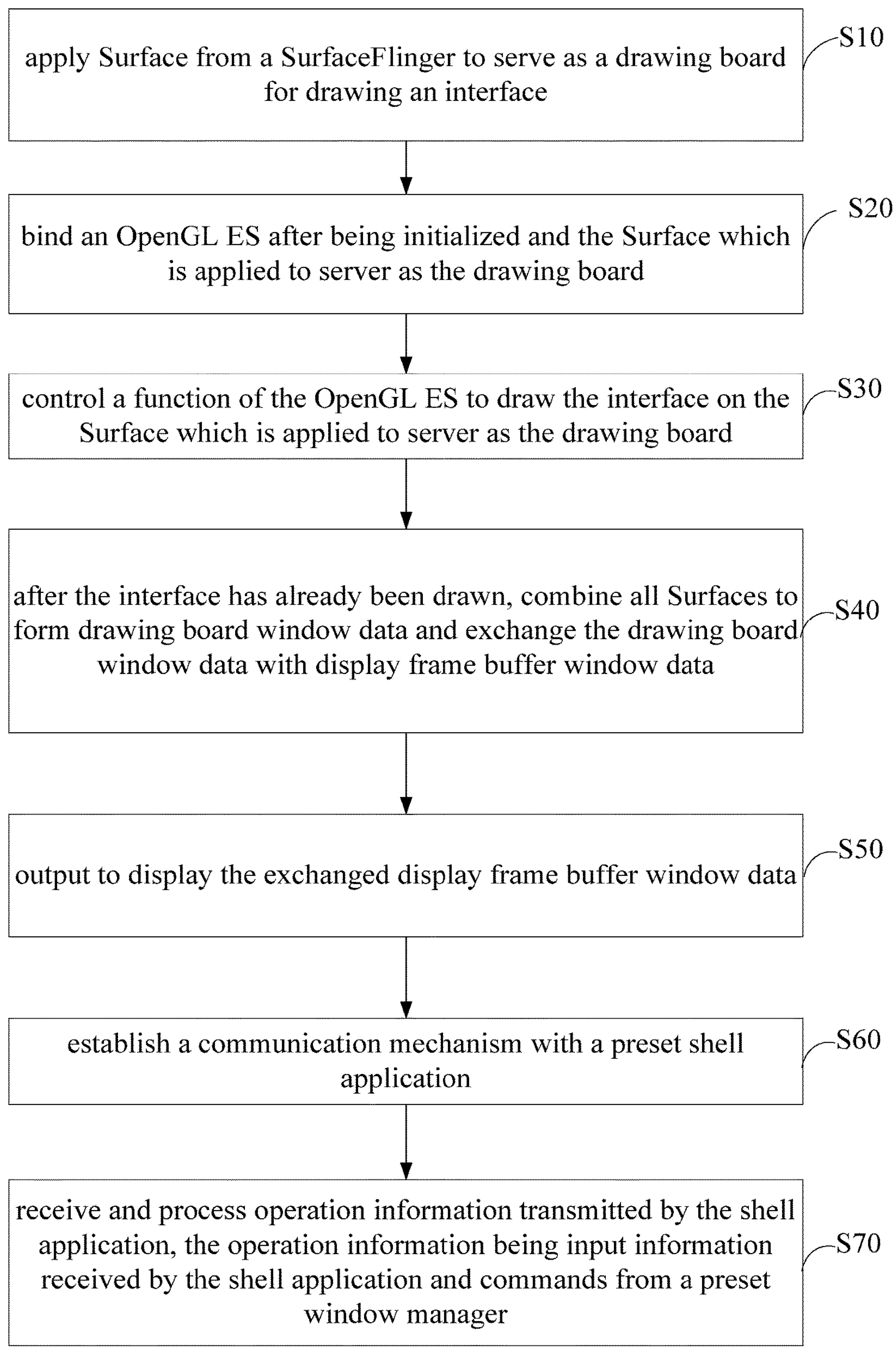
FIG. 2 is a flowchart of another embodiment of a user interface displaying and processing method.

Furthermore, referring to FIG. 2, in the embodiment, the user interface displaying and processing method further comprises:

At step S60, establishing a communication mechanism with a preset shell application;

At step S70, receiving and processing operation information transmitted by the shell application, the operation information being input information received by the shell application and commands from a preset window manager.

Since the user interface displaying and processing method of the present disclosure is independent of the Android application framework and the Dalvik virtual machine, thus, running the target application corresponding to the user interface displaying and processing method of the present disclosure on the Android system may cause incompatibilities of inputs and incompatibilities of outputs, mainly of button input, touch input, and window display controls. Taking remote button inputs for example, if the target application receives the remote button inputs, the Android application can also receive the remote button inputs. The reason for the incompatibilities is that the target application is not created by the Android application framework, thus, the window manager of the Android system doesn't know the existence of the target application.

To solve the above problem, the present disclosure first creates a common Android application which has no interface contents and appears as transparent (that is the shell application in the present disclosure). The shell application can receive inputs signals and output signals just like a common Android application, and can be controlled by the window manager. In the embodiment, the target application can first establish SOCKET communication mechanism with the shell application. The shell application can transmit the input signal and the commands from the window manager to the target application. The target application can process the input signals and the commands, thereby allowing the target application to be seamlessly run with the Android application framework.

Furthermore, in the embodiment, the user interface displaying and processing method further comprises following steps:

when a user interface displaying command is detected, calling a show( ) function to display an interface corresponding to the display frame buffer window data;

when a user interface hiding command is detected, calling a hide( ) function to hide an interface corresponding to the display frame buffer window data.

In the embodiment, the show( ) function and the hide( ) function are embedded application programming interface functions other than functions of the Android system. The Android system calls the show( ) function and the hide( ) function through the shell application, thereby displaying and hiding the user interface. The application of the present disclosure can act as a common Android system which can be called by the Android system, and the compatibilities are improved.

Figure 3:
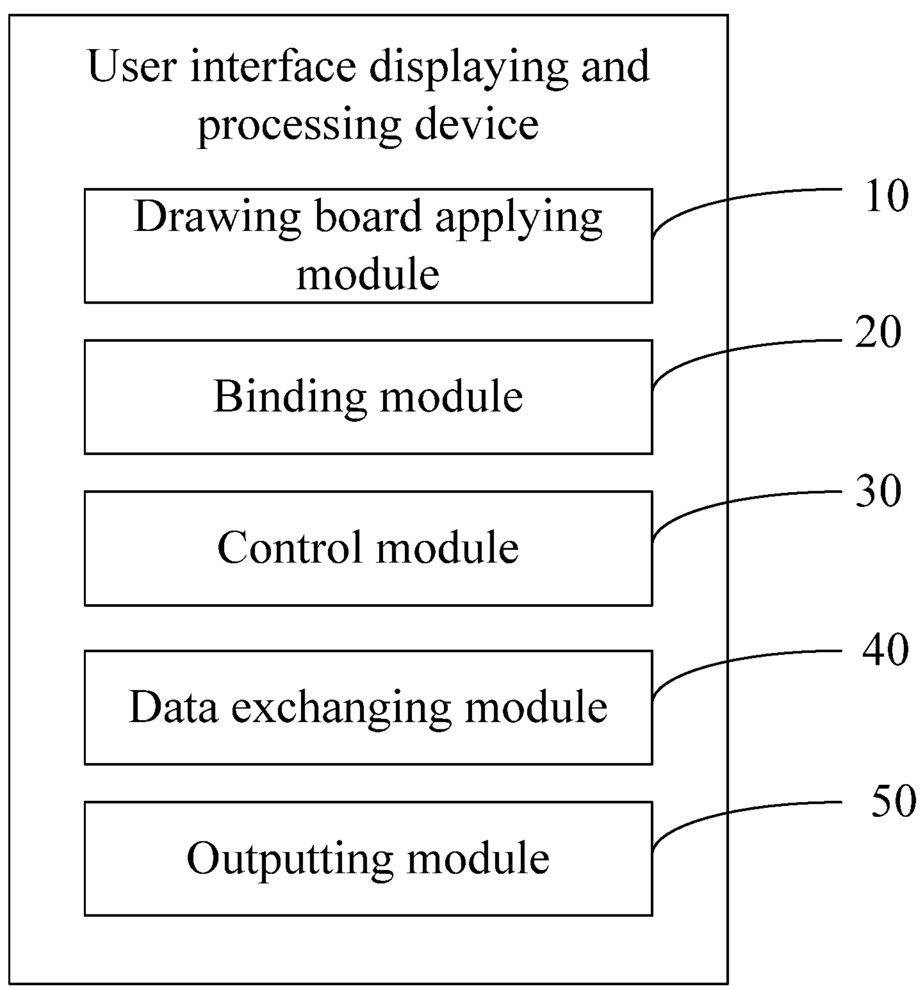
FIG. 3 is a block diagram of an embodiment of a user interface displaying and processing device.

The present disclosure further provides a user interface displaying and processing device. FIG. 3 illustrates that the user interface displaying and processing device comprises:

a drawing board applying module 10 configured to apply Surface from a SurfaceFlinger to serve as a drawing board for drawing an interface;

Since the user interface is drawn on a screen of a terminal, thus, a drawing board on which the user interface can be drawn is needed to be applied. The drawing board can be a frame buffer of hardware or a display object managed by an operation system. Since the user interface of the present disclosure is needed to be drawn seamlessly with the Android application framework, thus, the user interface displaying and processing method of the present disclosure applies the Surface from the SurfaceFlinger to serve as the drawing board for drawing the interface.

a binding module 20 configured to bind an OpenGL ES after being initialized and the Surface which is applied to server as the drawing board;

In detail, the OpenGLES (OpenGL for Embedded Systems) includes subsets of the OpenGL 3D Graphics API, and is designed according to embedded devices such as mobile phones, personal digital assistant (PDA), and game servers. The API is designed and promoted by Khronos Group. The Khronos Group is a graphic software and hardware industrial association which focuses on creating open standards for graphics and multimedia. OpenGL ES is a royalty-free and cross-platform API for full-function 2D and 3D graphics on embedded systems-including consoles, mobile phones, hand-held devices, appliances, and vehicles. It consists of well-defined subsets of desktop OpenGL, creating a flexible and powerful low-level interface between software and graphics acceleration. OpenGL ES includes profiles for floating-point and fixed-point systems, and the EGL specification for portably binding to native windowing systems. OpenGL ES 1.X is designed according to fixed function hardware and offers acceleration, image quality, and performance. OpenGL ES 2.X enables full programmable 3D graphics including cover devices.

When OpenGLES and the Surface are bounded, OpenGLES can communicate with the window system of the local system, thereby allowing the mathematical graphic operations of OpenGLES to be displayed on the Surface. Before operating OpenGLES, OpenGLES is needed to be initialized. After being initialized, OpenGLES and the Surface are bounded.

a control module 30 configured to control a function of the OpenGL ES to draw the interface on the Surface which is applied to server as the drawing board;

In the embodiment, the interface is drawn by the function of OpenGLES. In detail, when the interface is drawn, the function of OpenGLES is directly used to draw graphics on the Surface to form the user interface. It is understandable that when the interface is drawn, the graphic function of OpenGLES or texture mapping can be used. That is, in the embodiment, the step S30 further comprises: controlling the function of the OpenGL ES to draw graphics, by a graphic function of the OpenGL ES, on the Surface which is applied to server as the drawing board to form the interface; or controlling the function of the OpenGL ES to map, by texture mapping, on the Surface which is applied to server as the drawing board to form the interface.

a data exchanging module 40 configured to combine all Surfaces to form drawing board window data and exchange the drawing board window data with display frame buffer window data after the interface has already been drawn;

an outputting module 50 configured to output to display the exchanged display frame buffer window data.

In the embodiment, when a user interface has already been drawn, data is exchanged between display frame buffer window and drawing board window, thereby combining all the Surface to form the drawing board window data which is transferred to frame buffer window, that is, the drawing board window data is stored in a graphic memory; finally, the data in the graphic memory is output to display, thus the user interface can be displayed. In detail, a display chip can directly process the data of the frame buffer window, convert pixel signals if necessary, and output detail pixel signals to the screen if necessary. The screen can display the corresponding pixel according to the pixel signals.

The present disclosure applies Surface from a SurfaceFlinger to serve as a drawing board for drawing an interface; binding an OpenGL ES after being initialized and the Surface which is applied to server as the drawing board; controlling a function of the OpenGL ES to draw the interface on the Surface which is applied to server as the drawing board; after the interface has already been drawn, combining all Surfaces to form drawing board window data and exchanging the drawing board window data with display frame buffer window data; outputting to display the exchanged display frame buffer window data. Since the drawing and displaying of the user interface of the present disclosure is independent of the Android application framework and the Dalvik virtual machine, the portability of the application is improved.

Furthermore, in the embodiment, when the function of the OpenGL ES is controlled to draw the interface, the interface is dynamically displayed by a number of interface graphics, or the interface is dynamically displayed by render changing of OpenGL ES.

In detail, in the embodiment, the user interface can be statically or dynamically displayed. When the user interface is dynamically display, a number of interface graphics are used, or the render changing of OpenGL ES is used. For example, when a number of interface graphics are used to dynamically display the user interface, the interface is periodically drawn on the Surface which is applied to serve as the drawing board at a preset time interval, all Surface are combined to form the drawing board window data, the drawing board window data is exchanged with the display frame buffer window data, and the exchanged display frame buffer window data is output to display, thereby dynamically displaying the user interface. When the rendering changing of OpenGLES is used to dynamically display the user interface, the interface drawn on the Surface is periodically rendered at a preset time interval to obtain different effects, all Surface are combined to form the drawing board window data, the drawing board window data is exchanged with the display frame buffer window data, and the exchanged display frame buffer window data is output to display, thereby dynamically displaying the user interface.

Figure 4:
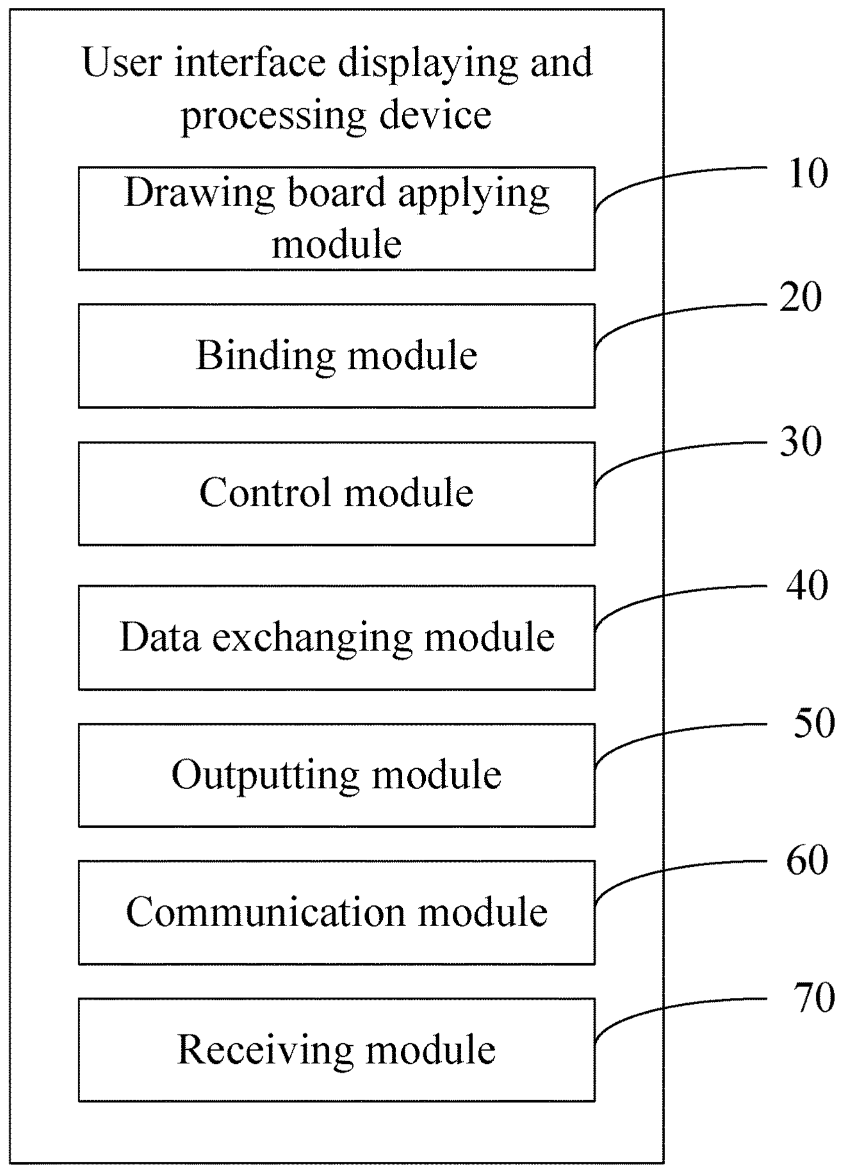
FIG. 4 is a block diagram of another embodiment of a user interface displaying and processing device.

Furthermore, referring to FIG. 4, in the embodiment, the user interface displaying and processing device further comprises:

a communication module 60 configured to establish a communication mechanism with a preset shell application;

a receiving module 70 configured to receive and process operation information transmitted by the shell application, the operation information being input information received by the shell application and commands from a preset window manager.

Since the user interface displaying and processing method of the present disclosure is independent of the Android application framework and the Dalvik virtual machine, thus, running the target application corresponding to the user interface displaying and processing method of the present disclosure on the Android system may cause incompatibilities of inputs and incompatibilities of outputs, mainly of button input, touch input, and window display controls. Taking remote button inputs for example, if the target application receives the remote button inputs, the Android application can also receive the remote button inputs. The reason for the incompatibilities is that the target application is not created by the Android application framework, thus, the window manager of the Android system doesn't know the existence of the target application.

To solve the above problem, the present disclosure first creates a common Android application which has no interface contents and appears as transparent (that is the shell application in the present disclosure). The shell application can receive inputs signals and output signals just like a common Android application, and can be controlled by the window manager. In the embodiment, the target application can first establish SOCKET communication mechanism with the shell application. The shell application can transmit the input signal and the commands from the window manager to the target application. The target application can process the input signals and the commands, thereby allowing the target application to be seamlessly run with the Android application framework.

Figure 5:
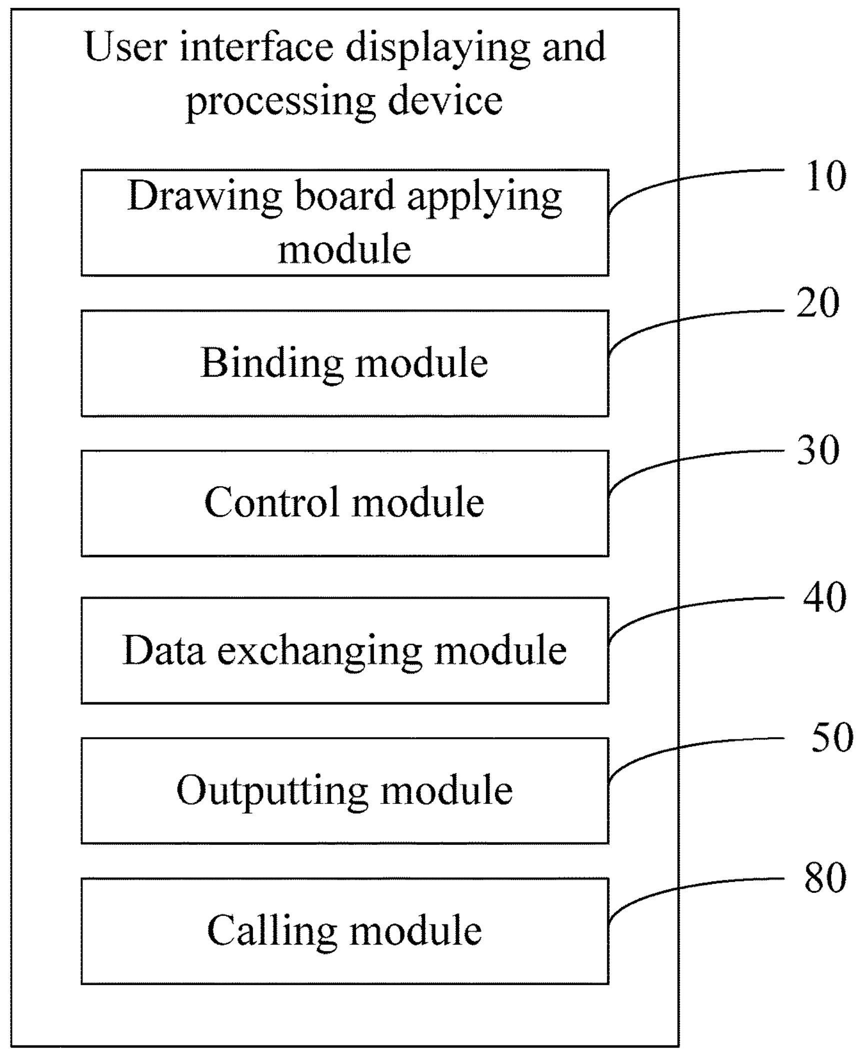
FIG. 5 is block diagram of yet another embodiment of a user interface displaying and processing device.

Furthermore, referring to FIG. 5, in the embodiment, the user interface displaying and processing device further comprises:

a calling module 80 configured to call a show( ) function to display an interface corresponding to the display frame buffer window data when a user interface displaying command is detected; and call a hide( ) function to hide an interface corresponding to the display frame buffer window data when a user interface hiding command is detected;

In the embodiment, the show( ) function and the hide( ) function are embedded application programming interface functions other than functions of the Android system. The Android system calls the show( ) function and the hide( ) function through the shell application, thereby displaying and hiding the user interface. The application of the present disclosure can act as a common Android system which can be called by the Android system, and the compatibilities are improved.

What described above are only preferred embodiments of the present disclosure but are not intended to limit the scope of the present disclosure. Accordingly, any equivalent structural or process flow modifications that are made on basis of the specification and the attached drawings or any direct or indirect applications in other technical fields shall also fall within the scope of the present disclosure.

What is claimed is:

1. A user interface displaying and processing method, being executed by a user interface displaying and processing program stored in a storage medium, the user interface displaying and processing program when being executed by a processor performing following steps:

establishing a communication mechanism with a preset shell application;

receiving and processing operation information transmitted by the shell application, the operation information being input information received by the shell application and commands from a preset window manager;

applying Surface from a SurfaceFlinger to serve as a drawing board for drawing an interface;

binding an OpenGL ES after being initialized and the Surface which is applied to server as the drawing board;

controlling a function of the OpenGL ES to draw the interface on the Surface which is applied to server as the drawing board;

after the interface has already been drawn, combining all Surfaces to form drawing board window data and exchanging the drawing board window data with display frame buffer window data;

outputting to display the exchanged display frame buffer window data.

2. The user interface displaying and processing method of claim 1, wherein the step of "controlling a function of the OpenGL ES to draw the interface on the Surface which is applied to server as the drawing board" further comprises following steps:

controlling the function of the OpenGL ES to draw graphics, by a graphic function of the OpenGL ES, on the Surface which is applied to server as the drawing board to form the interface; or controlling the function of the OpenGL ES to map, by texture mapping, on the Surface which is applied to server as the drawing board to form the interface.

3. The user interface displaying and processing method of claim 2, wherein when the function of the OpenGL ES is controlled to draw the interface, the interface is dynamically displayed by a plurality of interface graphics, or the interface is dynamically displayed by render changing of OpenGL ES.

4. The user interface displaying and processing method of claim 1, further comprising following steps:

when a user interface displaying command is detected, calling a show( )function to display an interface corresponding to the display frame buffer window data;

when a user interface hiding command is detected, calling a hide( )function to hide an interface corresponding to the display frame buffer window data.

5. The user interface displaying and processing method of claim 4, wherein the step of "controlling a function of the OpenGL ES to draw the interface on the Surface which is applied to server as the drawing board" further comprises following steps:

controlling the function of the OpenGL ES to draw graphics, by a graphic function of the OpenGL ES, on the Surface which is applied to server as the drawing board to form the interface; or controlling the function of the OpenGL ES to map, by texture mapping, on the Surface which is applied to server as the drawing board to form the interface.

6. The user interface displaying and processing method of claim 5, wherein when the function of the OpenGL ES is controlled to draw the interface, the interface is dynamically displayed by a plurality of interface graphics, or the interface is dynamically displayed by render changing of OpenGL ES.

7. The user interface displaying and processing method of claim 4, further comprising following steps:

establishing a communication mechanism with a preset shell application;

receiving and processing operation information transmitted by the shell application, the operation information being input information received by the shell application and commands from a preset window manager.

8. A user interface displaying and processing device comprising:

a communication module configured to establish a communication mechanism with a preset shell application;

a receiving module configured to receive and process operation information transmitted by the shell application, the operation information being input information received by the shell application and commands from a preset window manager;

a drawing board applying module configured to apply Surface from a SurfaceFlinger to serve as a drawing board for drawing an interface;

a binding module configured to bind an OpenGL ES after being initialized and the Surface which is applied to server as the drawing board;

a control module configured to control a function of the OpenGL ES to draw the interface on the Surface which is applied to server as the drawing board;

a data exchanging module configured to combine all Surfaces to form drawing board window data and exchange the drawing board window data with display frame buffer window data after the interface has already been drawn;

an outputting module configured to output to display the exchanged display frame buffer window data.

9. The user interface displaying and processing device of claim 8, wherein the control module is configured to:

control the function of the OpenGL ES to draw graphics, by a graphic function of the OpenGL ES, on the Surface which is applied to server as the drawing board to form the interface; or control the function of the OpenGL ES to map, by texture mapping, on the Surface which is applied to server as the drawing board to form the interface.

10. The user interface displaying and processing device of claim 9, wherein the control module is further configured to dynamically display the interface by a plurality of interface graphics or by render changing of OpenGL ES, when the function of the OpenGL ES is controlled to draw the interface.

11. The user interface displaying and processing device of claim 8, further comprising:

a calling module configured to call a show( )function to display an interface corresponding to the display frame buffer window data when a user interface displaying command is detected; and call a hide( )function to hide an interface corresponding to the display frame buffer window data when a user interface hiding command is detected.

12. The user interface displaying and processing device of claim 11, wherein the control module is configured to:

control the function of the OpenGL ES to draw graphics, by a graphic function of the OpenGL ES, on the Surface which is applied to server as the drawing board to form the interface; or control the function of the OpenGL ES to map, by texture mapping, on the Surface which is applied to server as the drawing board to form the interface.

13. The user interface displaying and processing device of claim 12, wherein the control module is configured to dynamically display the interface by a plurality of interface graphics or by render changing of OpenGL ES, when the function of the OpenGL ES is controlled to draw the interface.

14. The user interface displaying and processing device of claim 11, further comprising:

a communication module configured to establish a communication mechanism with a preset shell application;

a receiving module configured to receive and process operation information transmitted by the shell application, the operation information being input information received by the shell application and commands from a preset window manager.

* * * * *